US010367711B2

United States Patent
Desai et al.

(10) Patent No.: US 10,367,711 B2
(45) Date of Patent: Jul. 30, 2019

(54) PROTECTING VIRTUAL COMPUTING INSTANCES FROM NETWORK FAILURES

(71) Applicant: VMware, Inc., Palo Alto, CA (US)

(72) Inventors: Aalap Desai, Sunnyvale, CA (US); Manoj Krishnan, Sunnyvale, CA (US); Ravi Cherukupalli, San Ramon, CA (US); Rahul Chandrasekaran, Mountain View, CA (US); Prafulla Mahindrakar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 151 days.

(21) Appl. No.: 15/695,882

(22) Filed: Sep. 5, 2017

(65) Prior Publication Data

US 2019/0075036 A1 Mar. 7, 2019

(51) Int. Cl.
| | | |
|---|---|---|
| *G06F 15/173* | (2006.01) | |
| *H04L 12/26* | (2006.01) | |
| *H04L 29/08* | (2006.01) | |
| *H04L 12/24* | (2006.01) | |
| *G06F 9/48* | (2006.01) | |
| *G06F 9/455* | (2018.01) | |

(52) U.S. Cl.
CPC .......... *H04L 43/10* (2013.01); *H04L 41/0677* (2013.01); *H04L 67/1097* (2013.01); *G06F 9/455* (2013.01); *G06F 9/45558* (2013.01); *G06F 9/4856* (2013.01)

(58) Field of Classification Search
CPC . H04L 43/10; H04L 41/0677; H04L 67/1097; G06F 9/4856
USPC ........................................ 709/224, 223, 238
See application file for complete search history.

(56) References Cited

U.S. PATENT DOCUMENTS

| | | | |
|---|---|---|---|
| 9,304,796 B1 * | 4/2016 | Douglas | G06F 11/2028 |
| 10,223,189 B1 * | 3/2019 | Viswanathan | G06F 11/079 |
| 2017/0093754 A1 * | 3/2017 | Zhang | H04L 12/4641 |
| 2017/0214550 A1 * | 7/2017 | Kumar | H04L 41/0654 |
| 2017/0366401 A1 * | 12/2017 | Jiang | H04L 41/0866 |

OTHER PUBLICATIONS

Unknown, "How VMware HA Works", https://pubs.vmware.com/vsphere-4-esx-vcenter/index.jsp?topic=/com.vmware.vsphere.availability.doc_41/c_useha_works.html, captured Sep. 4, 2017, 3 pages.

* cited by examiner

*Primary Examiner* — Philip B Tran

(57) ABSTRACT

The subject matter described herein provides virtual computing instance (VCI) component protection against networking failures in a datacenter cluster. Networking routes at the host level, VCI level, and application level are monitored for connectivity. Failures are communicated to a primary host or to a datacenter virtualization infrastructure that initiates policy-based remediation, such as moving affected VCIs to another host in the cluster that has all the necessary networking routes functional.

20 Claims, 7 Drawing Sheets

PROTECTING VIRTUAL COMPUTING INSTANCES FROM NETWORK FAILURES

BACKGROUND

Existing systems use virtualization to share the resources of a modern datacenter. The datacenter may have a wide range of hardware components such as servers, storage devices, communication equipment, and the like, organized into clusters. Virtualization of the datacenter allows multiple guest operating systems to run in virtual machines (VMs) on a single host, sharing the underlying physical hardware of the host as well as sharing access to a datastore accessible to the host.

Some existing system monitor for host level failures and storage component failures, such as All Paths Down (APD) or Permanent Device Loss (PDL), in some of the clusters. In the event of such a failure, remediation may occur to restore functionality.

However, the existing systems lack a reliable and fast mechanism for detecting failures in host and VM level networking components. For example, VMs are typically configured to use virtual networks configured across hosts. If virtual network connectivity to a certain gateway or to a specific Internet Protocol (IP) address fails because of hardware issues, software networking configuration issues, or network outages on a router or switch connecting the hosts, the VMs on that virtual network (as well as the applications running in those VMs) experience network outages. The existing systems lack reliable and fast remediation workflows for network component failures that occur within a cluster for which high availability is desired.

BRIEF DESCRIPTION OF THE DRAWINGS

The present description will be better understood from the following detailed description read in the light of the accompanying drawings, wherein.

DETAILED DESCRIPTION

Figure 1:
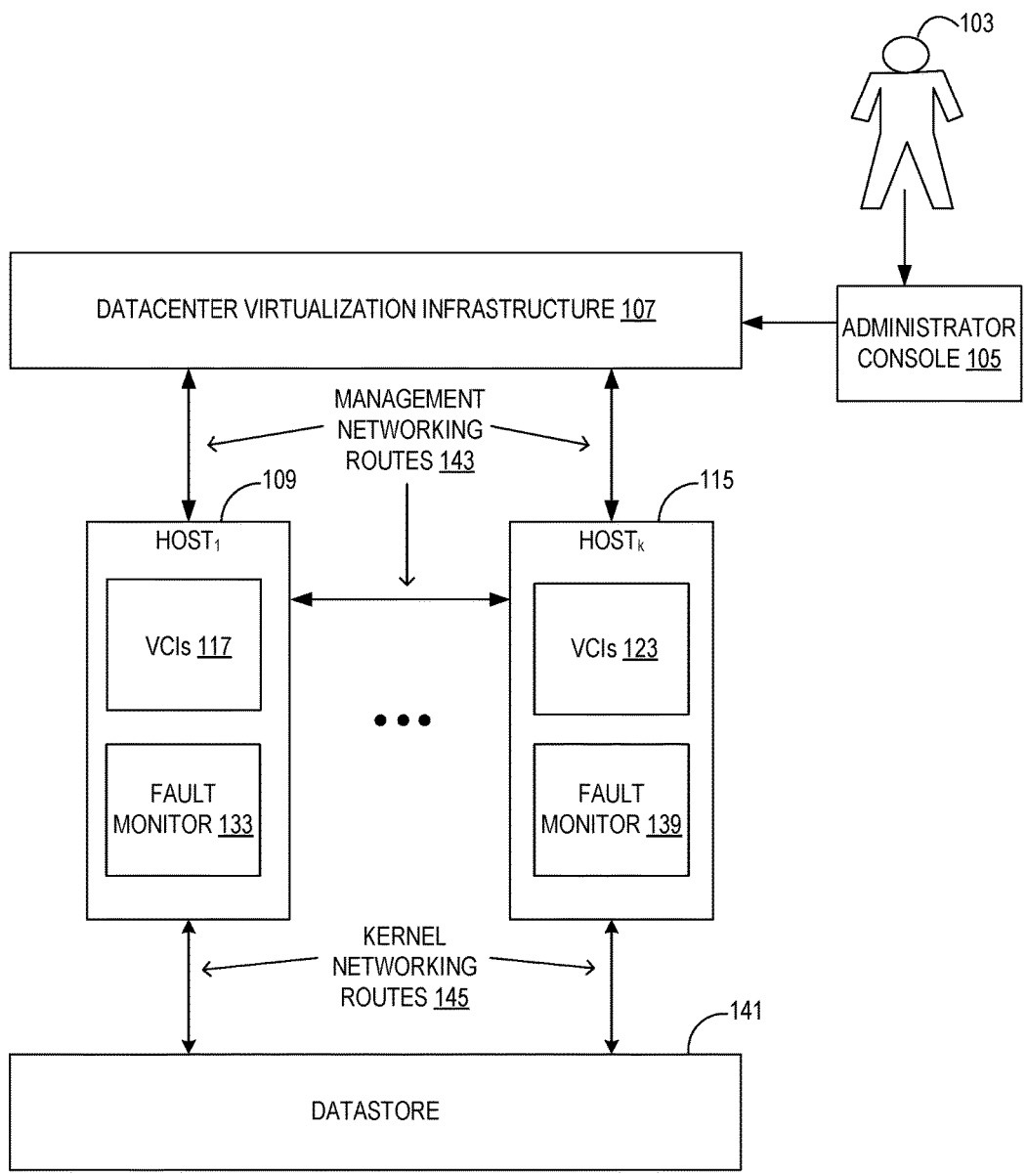
FIG. 1 illustrates a block diagram of a datacenter virtualization infrastructure (DVI) illustrating a plurality of host computing devices, hosted virtual computing instances (VCIs) each capable of running a guest operating system, and a datastore, all interconnected via various networking routes, according to an example embodiment.

Various aspects of the systems and methods described herein provide virtual computing instance (VCI) component protection for networking. The VCIs, such as virtual machines (VMs), containers, or other processes or applications, run on host devices (i.e., hosts) in a datacenter cluster coordinated by a datacenter virtualization infrastructure (DVI). An example of a DVI is vCenter® by VMware, Inc. that provides a platform for datacenter virtualization by managing hypervisors, such as ESXi® hypervisors, on hosts such as ESX® hosts. The present disclosure addresses situations where one or more networking components that provide connectivity for the hosts and the VCIs running thereon become non-functional, resulting in a network outage. In the event of a network outage, depending upon the policy set by an administrator or customer, remediation is performed. For example, the affected VCIs may be migrated to another host that has all the necessary networking components functional, may be shut down, may be rebooted, or another remediation may occur.

A plurality of networking routes provides connectivity to various components within the cluster. For example, VCI networking routes provide connectivity between VCIs and connect hosts to one or more network gateways. Management networking routes provide connectivity between the hosts and the DVI. The management networking routes also provide connectivity between hosts within the cluster. Kernel networking routes provide the hosts with connectivity to a shared datastore that contains data for proper functioning of the hosts and the VCIs hosted thereon. The kernel networking routes also provide connectivity between the hosts and a VCI migrator (e.g., hypervisor) that migrates a VCI to another host when needed. The kernel networking routes may also provide fault tolerance (FT) logging and virtual storage area networking (vSAN) traffic. While various networking routes are described herein, aspects of the disclosure are operable with other networking routes.

In contrast with existing systems that may monitor just one general networking route (e.g., connectivity between a host and a gateway), aspects of the disclosure monitor multiple networking routes for more robust failure detection. The monitoring is done by periodic pinging or by other testing or probing by various components at the guest and host level. By proactively monitoring multiple networking routes, failures may be detected, and remediation may occur, earlier than in existing systems.

For example, network resiliency is monitored from the perspective of the virtual host network interfaces (e.g., vmknics) serving the virtual network for all hosts in a cluster, using a command such as a vmkping to test virtual network connectivity. Similar network connectivity testing occurs for the other networking routes described herein (e.g., the management networking routes and the kernel networking routes). In addition, physical network interface and host level failures are monitored.

On detecting a network failure, a fault monitor or other agent on the host communicates the failure to a host in charge of initiating remediation. If a networking route is determined to be down, one or more policy-based actions are taken. For example, the affected VCIs may be live migrated to another host that has all the necessary networking routes functional and has adequate spare capacity for hosting the affected VCIs. With live migration, there is no interruption in the functioning of the affected VCIs perceptible to end users of the affected VCIs. Alternatively or in addition, remediation includes fault tolerance, which switches to a secondary VCI that has been running in lockstep with a primary VCI, when the primary VCI is affected by the failure.

In this manner, the disclosure is able to detect networking failures due to hardware failures, switch failures, port failures, cabling failures, and more because the networking routes are being monitored, rather than a state of each network hardware, software, and virtual component. Aspects of the disclosure improve the functioning of computing devices (i.e., the hosts), and improve the experience of users of those devices. The disclosure provides uninterrupted availability of the guest operating systems.

It should be understood that any of the examples herein are non-limiting. As such, the present disclosure is not limited to any particular embodiments, aspects, concepts, structures, functionalities or examples described herein. Rather, the present disclosure may be used in various ways that provide benefits and advantages in virtualized computing environments in general.

FIG. 1 shows an exemplary block diagram of a DVI 107, a plurality of host computing devices such as $Host_1$ 109 through $Host_K$ 115, and VCIs such as VCIs 117 and VCIs 123, all interconnected via various networking routes. Each of VCIs 117, 123 may be one or more VCIs. An administrator 103 configures the DVI 107 via an administrative console 105.

As described further with respect to FIG. 1, one of the hosts is designated to be a primary host while the remaining hosts are designated as secondary hosts. $Host_1$ 109 has a fault monitor 133 and $Host_K$ 115 has a fault monitor 139. The fault monitors 133, 139 are agents or other processes executed by their respective hosts that communicate detected networking failures, as a networking health status, to the primary host. The fault monitors 133, 139 receive notifications of networking failures detected at the host level, guest level (e.g., VCI level), and application level (e.g., application executed in the VCI). The primary host collects or receives the networking host status from each of the hosts (e.g., via the fault monitors 133, 139) in the cluster.

Each of the hosts is in communication with DVI 107 via management networking routes 143. The management networking routes 143 represent established networking channels for the communication of management commands and other data between DVI 107 and the hosts.

Each host is also in communication with a shared datastore 141 via kernel networking routes 145. The datastore 141 is any file system or any block or file based virtual store shared across all hosts. The datastore 141 contains all the data necessary for continued operation of the VCIs. For example, if a VCI is to be migrated to a recipient host, the recipient host also has access to the same shared data (in datastore 141) and hence the VCI to be migrated continues to have access to the same data (in datastore 141) on the recipient host.

Figure 2:
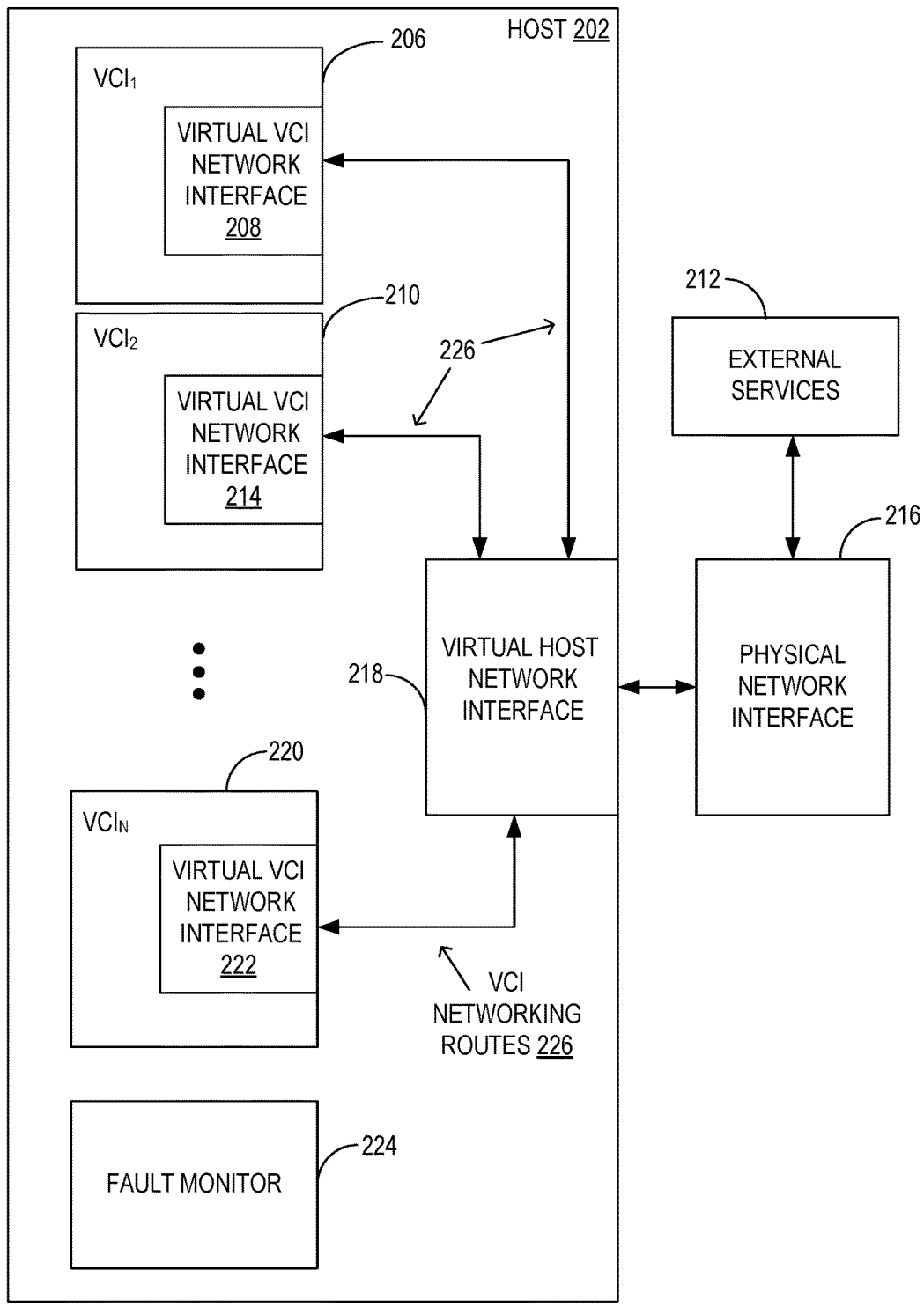
FIG. 2 illustrates a block diagram of a host with a plurality of VCIs and their network interfaces connected to a physical network interface, according to an example embodiment.

FIG. 2 shows a host 202 with a plurality of VCIs communicating through a virtual host networking interface (VHNI) 218 to a physical network interface 216. The plurality of VCIs include $VCI_1$ 206 and $VCI_2$ 210 through $VCI_N$ 220. Each of the VCIs 206, 210, 220 have a virtual VCI network interface (VNI), including VNIs 208, 214, and 222 respectively. The VNIs are connected to VHNI 218 via VCI networking routes 226. The VHNI 218 is connected to the physical network interface 216, which provides connectivity to a network gateway and external services 212 that may be reachable separate from the network gateway. For example, one or more VCIs may need access to an Oracle Secure Enterprise Search® or to some other database or application. In this example, the host 202 is a virtualized host and the physical network interface 216 is shown as external to the host 202. However, the disclosure is also operable with hosts that are not VCIs, in which the physical networking interface 216 is internal to such hosts.

FIG. 2 also depicts a fault monitor 224 that monitors the networking route connectivity of the VCIs and the host to the external services 212. In case of an interruption in communications to the external services 212, the fault monitor 224 communicates the fault information as a networking health status to a primary host, or the DVI 107 (see for example, FIG. 5), for remediation.

For example, a networking route connectivity interruption or other failure may occur because of a fault in VNIs 208, 214, 222, the VHNI 218, the physical network interface 216, a router, a switch, a port, a cable, or any other device in the networking route. A fault may also occur because of some configuration error within the VCI or within the guest operating system running on the VCI where the administrator 103 may have misconfigured the networking settings. The fault monitor 224 is able to detect any of these errors leading to interruption of communication through missed heartbeats, and transmits necessary information to DVI 107 for remediation.

To do so, networking route connectivity is monitored at multiple levels. Host level monitoring occurs by the host 202 periodically testing network connectivity through VHNI 218 using a command such as vmkping. The pings may be to IP addresses specified by an administrator or customer. When the ping is successful, a heartbeat indicator is communicated to the fault monitor 224. When a heartbeat indicator is not received by the fault monitor 224, the fault monitor 224 concludes that a networking route connectivity failure has occurred at the host level, and the networking health status reflecting this failure is sent to DVI 107. The networking failure at the host level indicates that all VCIs on that host are affected.

Guest level monitoring occurs at the VCI level. An application monitoring agent on each of VCIs 206, 210, 220 periodically tests network connectivity through VNIs 208, 214, 222 and VHNI 218 using a command other than vmkping to ping from within the VCI through an application executing on the VCI. The pings may be to IP addresses specified by an administrator or customer. When the ping is successful, a heartbeat indicator is communicated to the fault monitor 224. When a heartbeat indicates is not received by the fault monitor 224, the fault monitor 224 concludes that a networking route connectivity failure has occurred at the guest level or the host level, and the networking health status reflecting this failure is sent to DVI 107. A networking failure detected via this example indicates that a host level failure has occurred or that a guest level failure has occurred (e.g., the application on the VCI issuing the ping has been misconfigured).

In another example, guest level monitoring may also occur from an operating system of the VCIs 206, 210, 220. An operating system level tools suite, such as VMware Tools® by VMware, Inc., executes to periodically test network connectivity through VNIs 208, 214, 222 and VHNI 218 using pings. The pings may be to IP addresses specified by an administrator or customer. When the ping is successful, a heartbeat indicator is communicated to the fault monitor 224. When a heartbeat indicates is not received by the fault monitor 224, the fault monitor 224 concludes that a networking route connectivity failure has occurred at the host level or the guest level, and the networking health status reflecting this failure is sent to DVI 107. A networking failure detected via this example indicates that a host level failure has occurred or that a guest level failure has occurred (e.g., all applications running on the VCI will be affected).

By pinging a set of IP addresses at the host level and guest level, the fault monitor 224 is able to collect information allowing the fault monitor 224 or DVI 107 to better determine the nature of the networking route failure. For example, the failure may be a misconfiguration of a particular application executing on the VCI, a failure at the VCI level (e.g., VCI is down), a failure at the host level (e.g., VHNI 218 is down), or a failure of an external component (e.g., physical network interface 216, router, or switch is down).

In this manner, the fault monitor 224, primary host, or DVI 107 is equipped with enough information to initiate a suitable remediation. Initiating a suitable remediation may include providing the networking health status to another component to perform the remediation.

Figure 3:
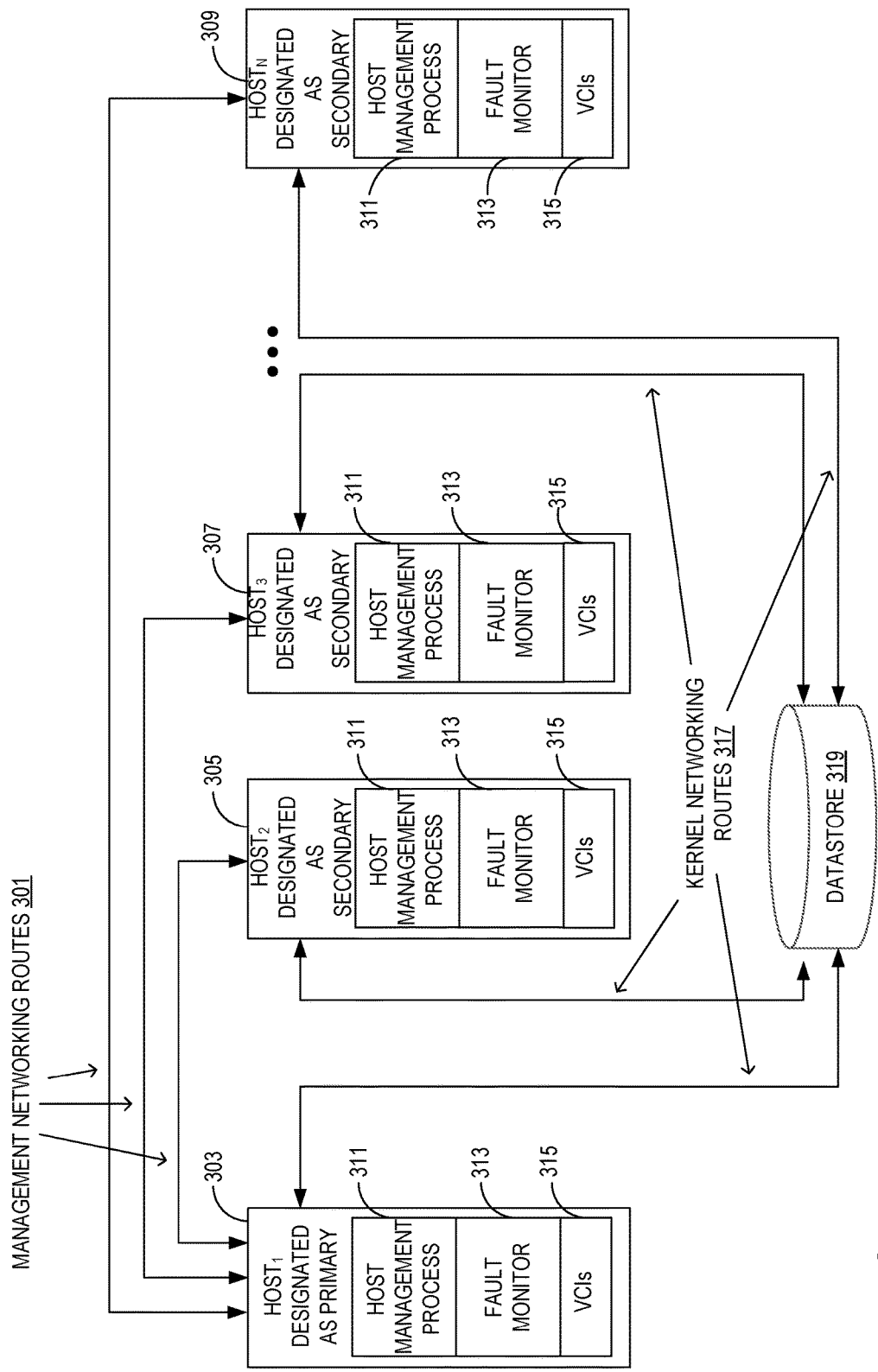
FIG. 3 illustrates a block diagram of a plurality of hosts with a plurality of VCIs interconnected with each other and to a shared datastore via various network routes, in a primary and secondary configuration, according to an example embodiment.

FIG. 3 illustrates a plurality of hosts configured as primary and secondary hosts in a cluster. Host$_1$ 303, Host$_2$ 305, and Host$_3$ 307 to Host$_N$ 309 are shown, with Host$_1$ 303 functioning as a primary host (e.g., primary host 511 in FIG. 5). Each of the hosts executes a host management process 311, a fault monitor 313 and VCIs 315. The host management processes 311 and fault monitors 313 monitor operations of the hosts and VCIs including monitoring management networking routes 301 and kernel networking routes 317. Management networking routes 301 provide communications among the hosts in the cluster. For clarity, FIG. 3 shows networking routes only from Host$_1$ 303 to each other host, while in practice each host communicates with each other hosts via management networking routes 301. Kernel networking routes 317 provide the hosts with accessibility to datastore 319.

The host management processes 311 and the fault monitors 313 test for connectivity failures in the management networking routes 301 and the kernel networking routes 317 at the host level, guest level, or both, such as described with reference to FIG. 2. For example, the host management processes 311 monitor the kernel networking routes 317 to determine whether the hosts continue to maintain accessibility to datastore 319. Should a kernel networking route 317 of a host be down, the host management process 311 provides this information to the corresponding fault monitor 313. The fault monitor 313 provides the failure information to the primary host, which either initiates remediation or forwards the failure information to DVI 107. For example, based on the policy set by the administrator 103, the primary host may command the affected host to power down the VCIs running on the affected host (e.g., if a pre-defined number of the VCIs have networking failures) and the primary host may re-start those VCIs on another host that has a valid network connection to datastore 319. The network route connectivity is monitored and prompts remediation, rather than the state of any individual network hardware, software, or virtualized component failure.

In a similar manner, the host management processes 311 monitor the management networking routes 301 to determine whether the hosts continue to maintain connectivity to each other. Should a management networking route 301 of a host be down, the host management process 311 provides this information to the corresponding fault monitor 313. The fault monitor 313 provides the failure information to the primary host, which either initiates remediation or forwards the failure information to DVI 107.

The primary/secondary designations indicate which host is responsible for collecting heartbeat and/or failure information from each of the fault monitors on the hosts in the cluster, and for initiating remediation or forwarding the information to DVI 107 to initiate remediation. Which host in a cluster functions as a primary host is based on a policy set by an administrator. The other hosts become secondary to this primary host. Further, the administrator may specify rules that determine the sequence in which another host would take over as primary host in the event of a functioning primary developing a fault. In one example, the policy and rules are stored on all the hosts so that in the event of failure of the primary host, a new primary host designation will occur.

For example, the policy may indicate that a random secondary host should be selected as the new primary host, or that a round robin operation across the secondary hosts be performed to select the new primary host.

The entity responsible for implementing remediation (e.g., the primary host, DVI 107, etc.) maintains a list of all the hosts in the cluster, their spare resources, their connectivity status and compatibility to run various VCIs. This entity also maintains a list of hosts that are not allowed to accept migration of particular VCIs. For example, the DVI 107, runs a distributed resource scheduling (DRS) algorithm based on the information provided by the primary host that provides recommendations for migration, re-start or shut down of an affected VCI based on a policy stored in the DVI 107. The DVI 107 takes necessary remediation action based on the recommendations provided by the DRS algorithm. In some example embodiments, the DVI 107 or the primary host may perform the migration, re-start or shut down functions. Further, based on the detected inaccessibility of the one or more IP addresses on a host, the information available with the primary host is updated for use in subsequent migration or re-start of any VCI on the affected host(s).

Figure 4:
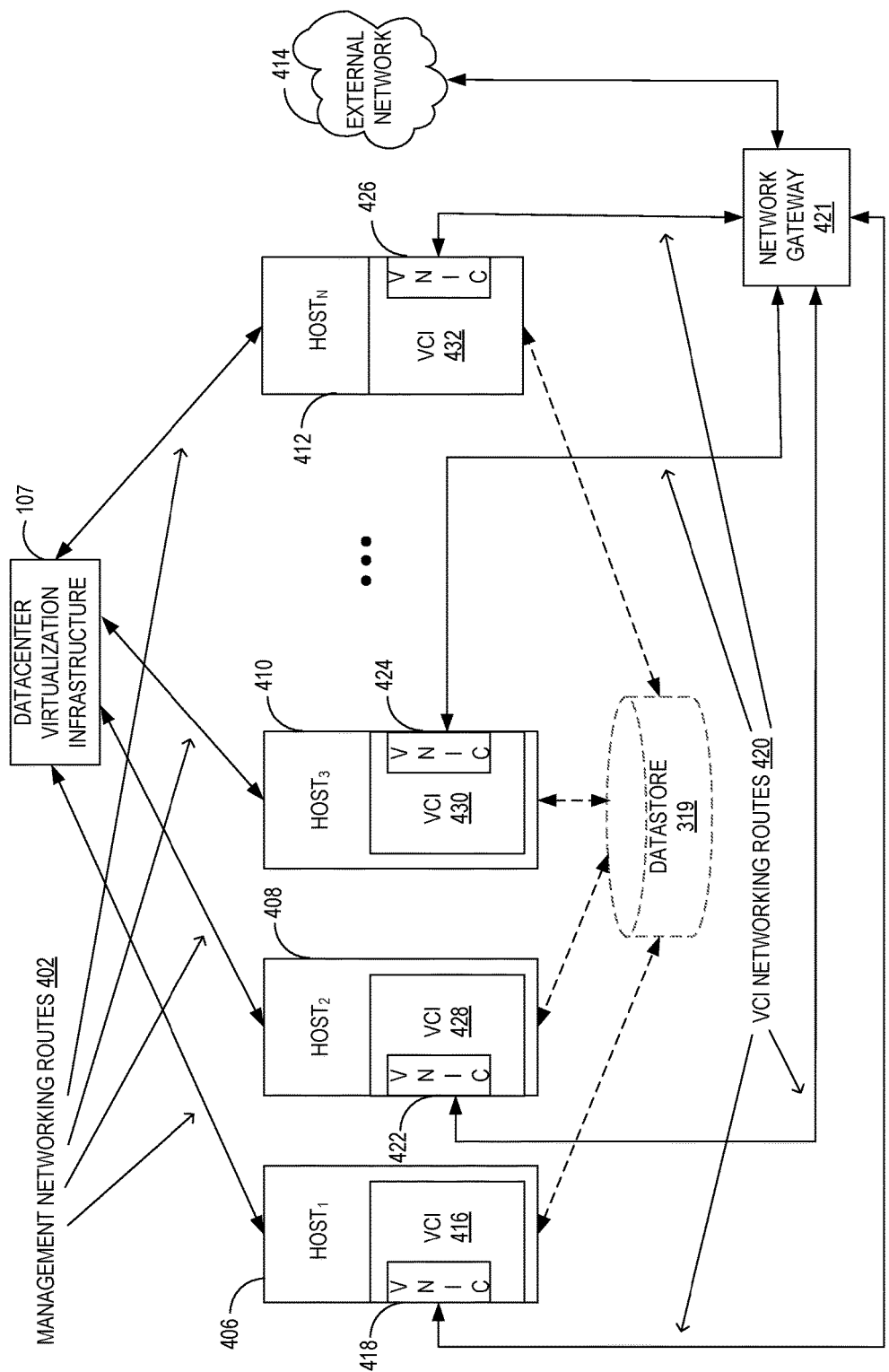
FIG. 4 is a block diagram illustrating a plurality of hosts with VCIs connected to an external gateway via their corresponding virtual network interface cards (VNICs) and VCI networking routes, according to an example embodiment.

FIG. 4 illustrates a plurality of hosts communicating with a DVI 107. The hosts include Host$_1$ 406, Host$_2$ 408, and Host$_3$ 410 through Host$_N$ 412. Each host is connected to the DVI 107, via management networking routes 402. These hosts execute VCIs 416, 428, 430 and 432 respectively. The VCIs have corresponding virtual network interface cards (VNICs) represented by VNICs 418, 422, 424, and 426 respectively, or other VNIs such as shown in FIG. 2. The VNICs communicate with a network gateway 421 via VCI networking routes 420. The network gateway 421 communicates with an external network, for example the Internet. This configuration enables the VCIs to run web services and/or other services that need to communicate with entities outside the datacenter. Fault monitors available on the hosts (not shown) monitor the VCI networking routes 420 (amongst other routes). Any interruption of a VCI networking route 420 leads to a remediation action. FIG. 4 also depicts, via dashed lines, access by the hosts to datastore 319.

In the example of FIG. 4, the remediation action is performed by the DVI 107 using management networking routes 402. For example, a policy stored by the DVI 107 has a rule that if a management networking route 402 to the DVI 107 from a host is down, all the VCIs running on the affected host should be migrated. In that instance, the DVI 107 initiates migration of the affected VCIs to a different host.

The DVI 107 in the example of FIG. 4 also initiates remediation for any network outage on any of the networking routes, including the VCI networking routes, management networking routes, kernel networking routes, and any other networking routes. Failures communicated to the DVI 107 from each host are evaluated and any network outage on any of the networking routes evokes a response as defined in the policy. In some examples, the policy also specifies which networking routes are required to be monitored and what remediation action is to be taken under any specific network outage condition. This policy is communicated to all the hosts.

Figure 5:
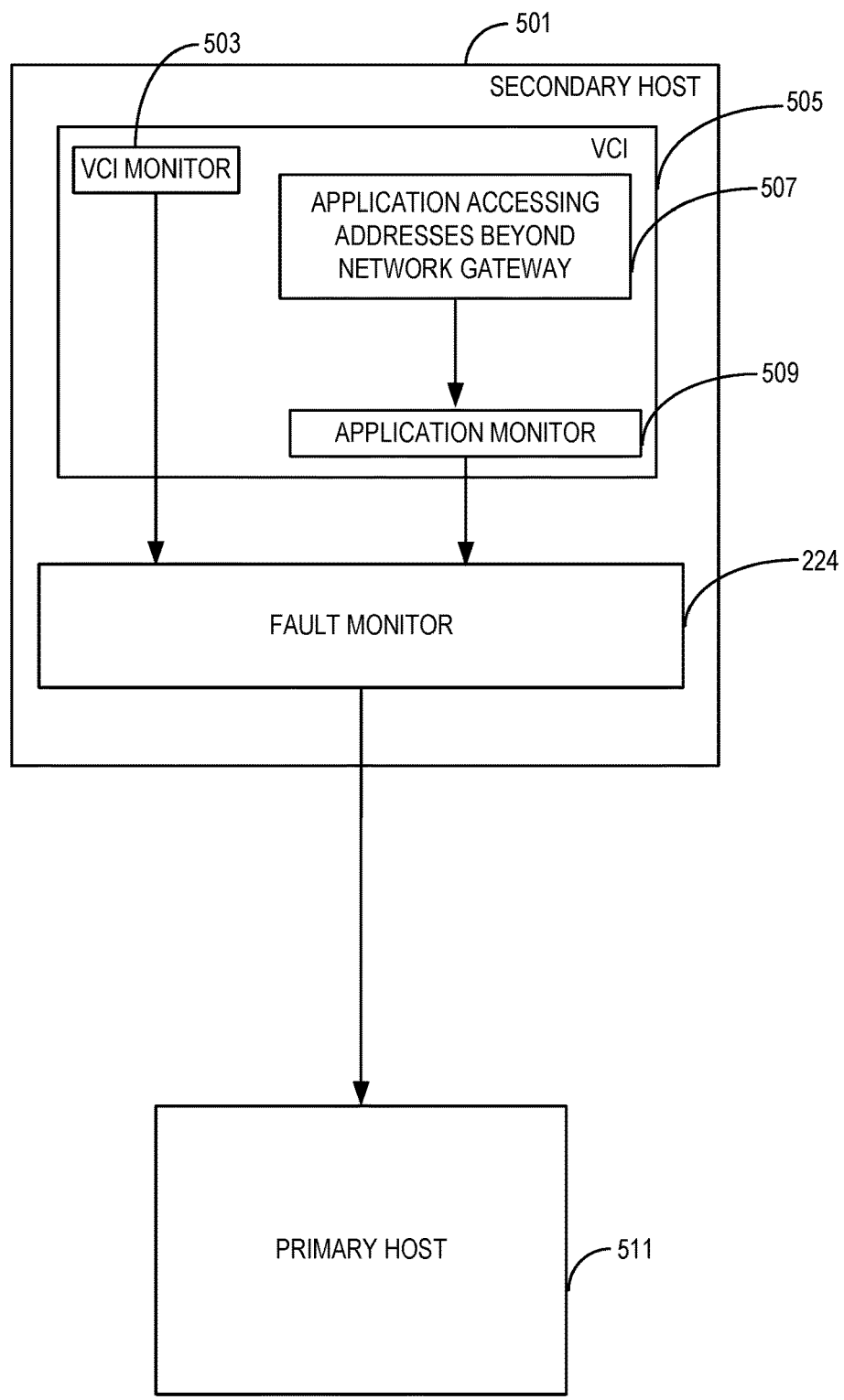
FIG. 5 is a block diagram illustrating a secondary host with a VCI having a VCI monitor and an application monitor, each being connected to a fault monitor that is in turn connected to a primary host, according to an example embodiment.

FIG. 5 illustrates a secondary host 501 hosting a VCI 505 and communicating with a primary host 511. In this example, and as in the description of FIG. 2, guest level monitoring of networking routes occurs. An application monitor 509 and a VCI monitor 503 run within the VCI 505. The guest level monitoring occurs at the application level, with the application monitor 509 detecting network connectivity failure resulting from an application 507 attempting to access network addresses other than a network gateway. The application monitor 509 may also ping various network addresses separately to detect network failures. The guest level monitoring also occurs at an operating system level, with the VCI monitor 503 pinging various network addresses to detect network failures.

The VCI monitor 503 and the application monitor 509 provide a networking health status to the fault monitor 224 as a result of pinging the network connectivity. The networking health status may include a heartbeat indicator indicating a successful ping attempt, or a lack of a heartbeat indicator which indicates a networking connectivity failure. The fault monitor 224 communicates any faulty conditions (e.g., the status of all the networking routes) to the primary host 511. The primary host 511 may initiate remediation based on a policy set by an administrator, or may forward the networking health status to the DVI 107 to perform remediation.

Figure 6:
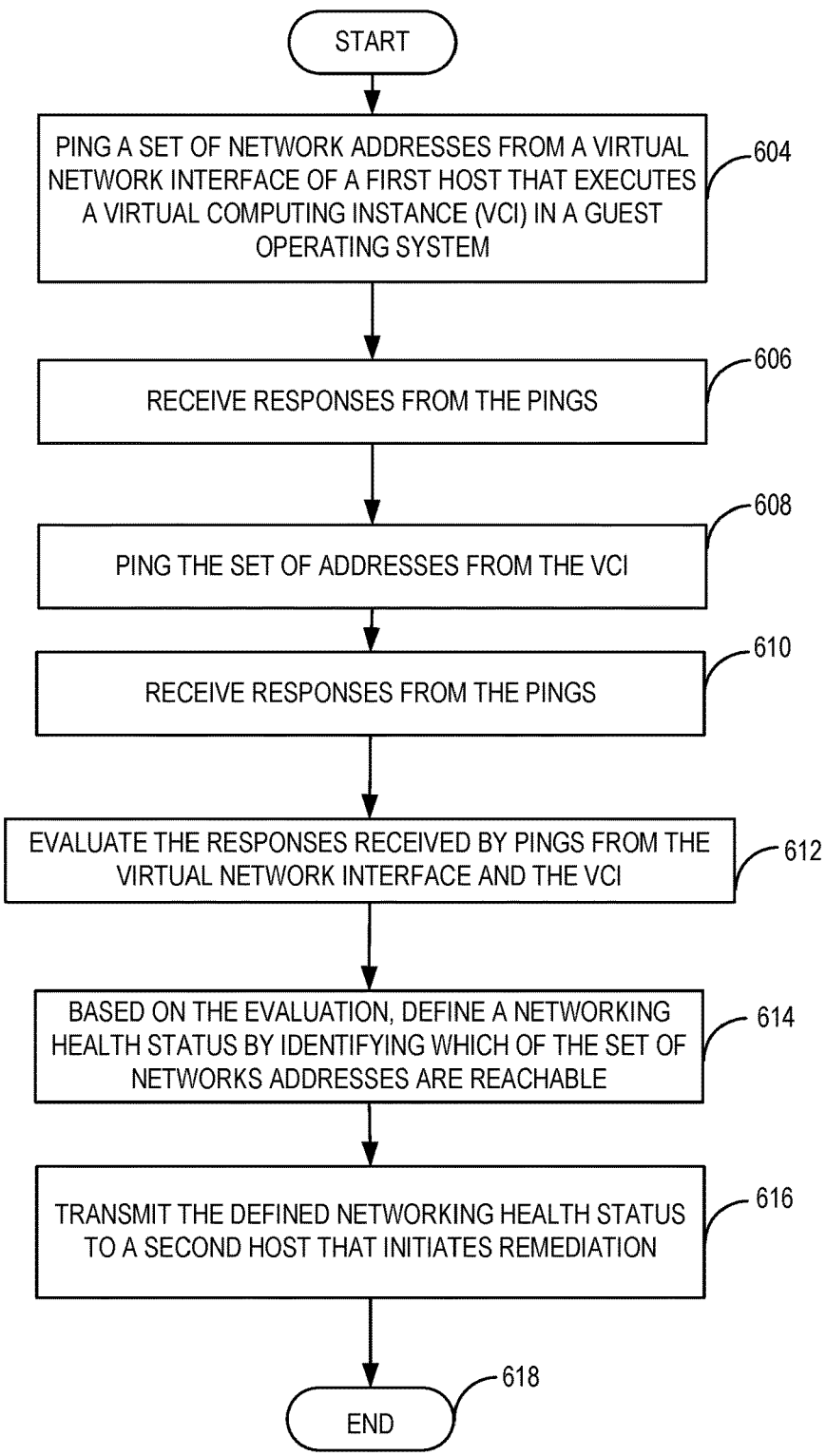
FIG. 6 is a flowchart illustrating a host and a VCI running on the host pinging a set of network addresses and transmitting the accessibility status to another host, according to an example embodiment.

FIG. 6 is a flowchart illustrating operations performed by a process for determining a networking health status of a host executing a VCI. The example operations illustrated in FIG. 6 may be performed by agents or other processes executing on the host. At 604, a set of network addresses is pinged from a VNI of the host via a first command. At 606, responses from the ping attempts are received. At 608, the same set of addresses is pinged from the VCI via a second command. At 610, responses from the attempted pings are received. The set of IP addresses are defined by an administrator or customer, and represent those IP addresses that should always be reachable by that VCI. For example, the addresses of certain databases, web services, applications, certain media objects, and/or datastores may be set as essential addresses.

At 612, the responses received from both the VNI and VCI ping attempts are evaluated. At 614 the networking health status of the host is evaluated by determining whether the set of network addresses is reachable from the VNI of the first host and/or the VCI. The networking health status may specify that a networking failure has occurred at the host level (e.g., through failure of one or more of the VNI pings), or the guest level (e.g., through failure of one or more of the VCI pings). In another example (not shown), two sets of pings from the VCI occur, application level monitoring and operating system level monitoring, to further pinpoint the type of networking failure.

At 616, the defined networking health status is transmitted to a second host that may initiate remediation (e.g., based on a policy) for the first host based on the defined networking health status. Different customers may take different remediation actions based on their requirements for their VCIs.

In some example embodiments, a plurality of rules is stored in the policy and a specific rule is invoked based on the networking health status. In one example, if the networking health status indicates that one or more essential IP addresses are not reachable from the VCI, the second host re-starts the VCI on a third host that can provide the VCI with access to the essential addresses.

The third host may be selected at random from the other hosts in the cluster, or a round robin operation across the hosts be performed to select the third host. For example, when selecting the third host to receive the VCI, the DVI 107 may request that a number of candidate third hosts check their network connectivity to the specified set of IP addresses required by the VCI. In this example, all the candidate third hosts store the cluster configuration via a distributed store and hence have access to this specified set of IP addresses. If a candidate third host responds back with an affirmative acknowledgment indicating that it can connect to the specified set of IP addresses or gateways via the specified network, the VCI from the host with the network failure is migrated to this third host. Further, the acknowledgements from each candidate third host are communicated to the DRS algorithm so that the DRS algorithm does not attempt to migrate other VCIs hosts that are plagued by the same or other network outage.

When selecting a third host to receive the VCI, the DRS algorithm also takes into consideration network resource reservations (e.g., vmnic reservations) made on the VCIs to ensure that the third host has enough network resources to satisfy these reservations. If a candidate third host does not have enough resources to satisfy the reservations, the DRS algorithm rebalances VCIs within the cluster to create enough resources for the failed VCI.

Figure 7:
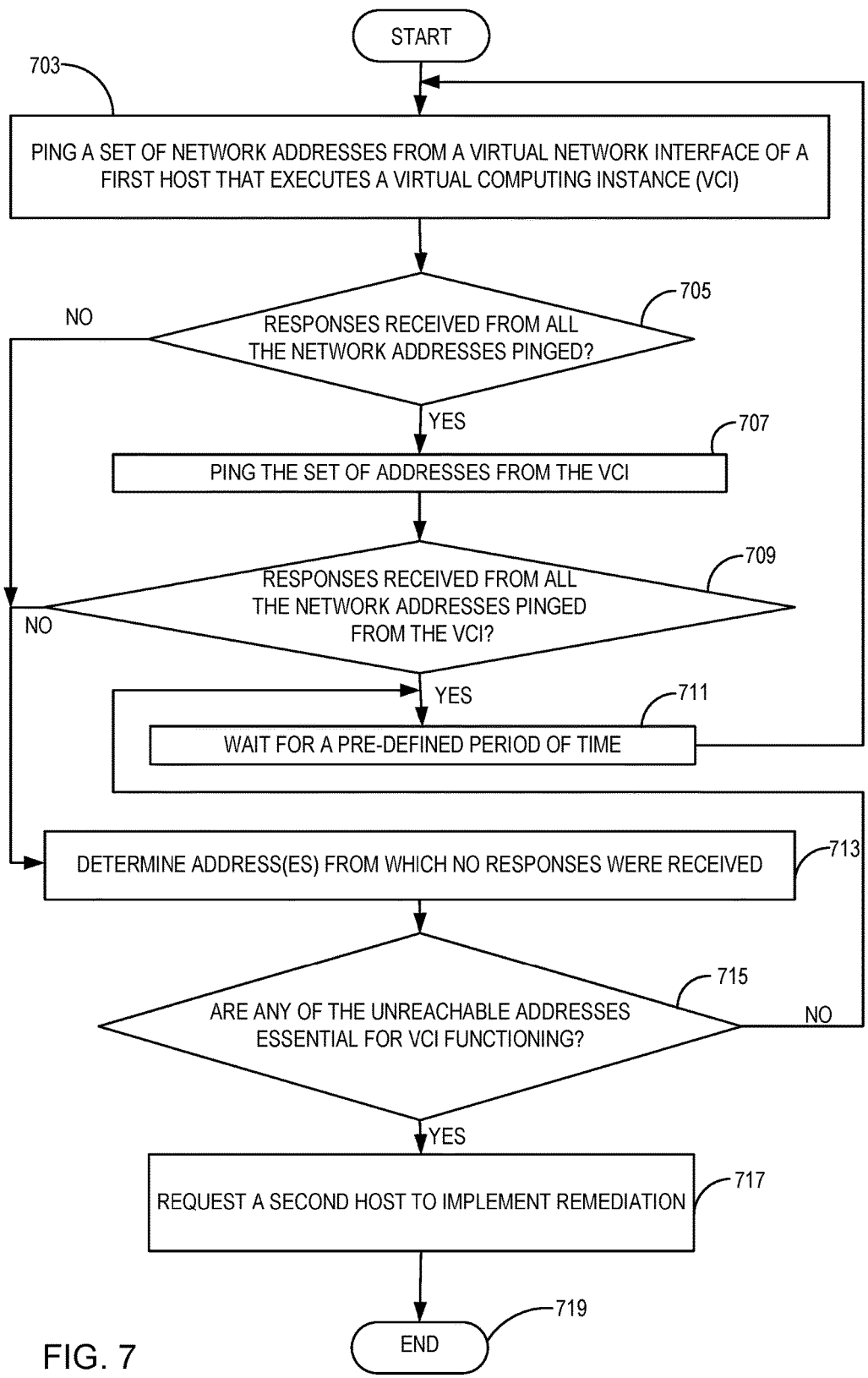
FIG. 7 is a flowchart illustrating a host and VCI running on the host pinging a set of network addresses and upon detecting inaccessibility requesting another host to implement remediation, according to an example embodiment.

FIG. 7 is a flowchart that shows another example process for pinging designated network addresses and taking remedial action. At 703, a set of network addresses is pinged from a VNI of a host with a guest operating system that executes a VCI. At 705, if it is determined that responses from all the addresses pinged from the VNI have been received, then at 707 the same set of addresses is pinged from the VCI. At 709, if it is determined that responses from all the addresses pinged from the VCI have been received, then after waiting for a pre-determined time at 711, control is transferred back to 703 for a next iteration of pings.

However, if checking at 705 indicates that responses from all the addresses pinged were not received, or if checking at 709 indicates that responses from all the addresses pinged were not received, a determination is made at 713 of which addresses were unreachable. At 715, a determination is made whether any of the unreachable addresses are essential for the host or the VCIs running on the host. If none of the unreachable addresses are found to be essential, control is transferred back to 711 for a next iteration of monitoring. If, however, any of the unreachable addresses are found to be essential, then at 717 a second host (e.g., a primary host or DVI 107) is requested to perform remediation. Depending on the remediation policy and the networking health status, remediation may include restarting the VCI, migrating the VCI, or migrating all VCIs on the host, for example.

In another example, if the first preferred remediation action for loss of accessibility to one or more specific IP addresses as set in the policy is live migration of the affected VCI, but the associated kernel networking route used to control migration has also failed, then other preferred actions as given in the policy are taken. For example, the second preference may be to keep the affected VCI running because that VCI may still be able to perform a few tasks, or to simply shut down the affected VCI.

Exemplary Scenarios

Monitoring failures via the vmkping utility (e.g., a first command) indicates whether there are host, hardware, or routing level issues, while monitoring failures via application monitoring (e.g., a second command) indicates whether there are guest level, operating system level, or operating system network misconfiguration issues, in addition to reacting against host, hardware, or routing level issues.

One example scenario checks only for failures using the vmkping utility, while another example scenario only checks for failures using the application monitoring operations described herein. Still another example scenario is a hybrid approach in which network health is monitored via both vmkpings and guest level application monitoring. These scenarios may be instructed via policies.

Using the hybrid approach, in one example, a vmkping via a specific network on a host may work fine, but the guest level application monitoring for the VCI may indicate failed access to a specified gateway. This implies that the network failure is because of VCI, operating system, or guest network configuration error as opposed to an outage due host, hardware, or routing level issues. In such cases, this failure is logged and reported to the customer of the VCI to verify the network configuration.

Exemplary Operating Environment

While some virtualized embodiments are described with reference to VMs for clarity of description, the disclosure is operable with other forms of VCIs. A VCI may be a VM, a container, and/or any other type of virtualized computing instance.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'server', 'computing device' and the like are used herein to refer to any device with processing capability such that it can execute instructions. Those skilled in the art will realize that such processing capabilities are incorporated into many different devices and therefore the terms 'computer', 'server', and 'computing device' each may include PCs, servers, laptop computers, mobile telephones (including smart phones), tablet computers, and many other devices.

Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for determining network outages that may occur in a datacenter virtualization infrastructure that employs a plurality of networking routes for communication between components of the datacenter virtualization infrastructure and objects outside it, and to determine any of the network outages and take appropriate measure so as to provide continuous availability of the plurality of virtual computing instances being used by a plurality of users.

The term "comprising" is used in this specification to mean including the feature(s) or act(s) followed thereafter, without excluding the presence of one or more additional features or acts.

What is claimed is:

1. A system for virtual computing instance (VCI) component protection for networking, said system comprising:
   at least one physical processor; and
   at least one memory comprising computer program code, the at least one memory and the computer program code configured to, with the at least one physical processor, cause the processor to at least:
   evaluate a networking health status associated with a first host executing the VCI, the evaluating comprising:
   pinging, via a first command, a set of network addresses from a first virtual network interface available to the first host, and pinging, via a second command, the set of network addresses from a second virtual network interface available to the VCI;

define the networking health status based on the evaluation, the defining comprises identifying which of the set of network addresses are reachable; and initiate a remediation action for the first host based on the defined networking health status.

2. The system of claim 1 wherein, evaluating the networking health status of the first host further comprises determining a health status of a management networking route for communication between the first host and a datacenter virtualization infrastructure.

3. The system of claim 1 wherein, evaluating the networking health status of the first host further comprises determining a health status of a kernel networking route for communication between the first host and a datastore, wherein a host management process monitors the kernel networking route and determines whether the first host continues to maintain accessibility to the datastore.

4. The system of claim 3 wherein, the kernel networking route further comprises one or more of the following: a fault tolerance (FT) logging route, a virtual storage attached network (vSAN) route, and a network route used for VCI migration.

5. The system of claim 1, wherein initiating the remediation is performed by a second host, and wherein the second host selects a third host based on a networking health status associated with the third host, and initiates migration of the VCI executing on the first host to the selected third host.

6. The system of claim 1 further comprising determining whether the set of network addresses is reachable by a plurality of VCIs, and shutting down the plurality of the VCIs upon determining that the set of network addresses are not reachable by more than a pre-defined number of VCIs of the plurality of VCIs executing on the first host and re-starting the plurality of the VCIs on a host other than the first host.

7. The system of claim 1, wherein the set of network addresses includes an address of at least an object needed for operation of the VCI or the first host, and wherein upon determining that the object is unreachable by the VCI or the first host, initiating remediation.

8. A method for virtual computing instance (VCI) component protection for networking, said method comprising:

evaluating a networking health status associated with a first host executing the VCI, the evaluating comprising:

pinging a set of network addresses from a virtual network interface available to the first host, and pinging the set of network addresses from the VCI;

defining the networking health status based on the evaluation, the defining comprises identifying which of the set of network addresses are reachable; and initiating remediation for the first host based on the defined networking health status.

9. The method of claim 8 wherein, evaluating the networking health status of the first host further comprises determining a health status of a management networking route for communication between the first host and a datacenter virtualization infrastructure.

10. The method of claim 8 wherein, evaluating the networking health status of the first host further comprises determining a health status of a kernel networking route for communication between the first host and a datastore.

11. The method of claim 10 wherein, the kernel networking route further comprises one or more of the following: a fault tolerance (FT) logging route, a virtual storage attached network (vSAN) route, and a network route used for VCI migration.

12. The method of claim 8, wherein initiating the remediation is performed by a second host, and wherein the second host selects a third host based on a networking health status associated with the third host, and initiates migration of the VCI executing on the first host to the selected third host.

13. The method of claim 8 further comprising determining accessibility of a plurality of VCIs executing on the first host to the set of network addresses, shutting down the plurality of the VCIs upon determining that the set of network addresses are not reachable by more than a pre-defined number of VCIs of the plurality of VCIs executing on the first host and re-starting the plurality of the VCIs on a host other than the first host.

14. The method of claim 8, wherein the set of network addresses includes an address of at least an object specified for operation of the VCI or the first host, and wherein upon determining that the object is unreachable by the VCI or the first host, initiating remediation.

15. One or more non-transitory computer storage media having computer-executable instructions that, upon execution by a processor, cause the processor to at least perform operations comprising:

evaluating a networking health status associated with a first host executing the VCI, the evaluating comprising:

pinging a set of network addresses from a virtual network interface available to the first host, and pinging the set of network addresses from the VCI;

defining the networking health status based on the evaluation, the defining comprises identifying which of the set of network addresses are reachable; and initiating remediation for the first host based on the defined networking health status.

16. The one or more non-transitory computer storage media of claim 15, wherein evaluating the networking a health status of the first host further comprises determining health status of a management networking route for communication between the first host and a datacenter virtualization infrastructure.

17. The one or more non-transitory computer storage media of claim 15, wherein evaluating the networking a health status of the first host further comprises determining health status of a kernel networking route for communication between the first host and a datastore.

18. The one or more non-transitory computer storage media of claim 17, wherein the kernel networking route further comprises one or more of the following: a fault tolerance (FT) logging route, a virtual storage attached network (vSAN) route, and a network route used for VCI migration.

19. The one or more non-transitory computer storage media of claim 15, wherein initiating the remediation is performed by a second host, and wherein the second host selects a third host based on a networking health status associated with the third host, and initiates migration of the VCI executing on the first host to the selected third host.

20. The one or more non-transitory computer storage media of claim 15, wherein the set of network addresses includes an address of at least an object specified for operation of the VCI or the first host, and wherein upon determining that the object is unreachable by the VCI or the first host, initiating remediation.

* * * * *